Patented July 25, 1950

2,516,402

UNITED STATES PATENT OFFICE 2,516,402

FLUOROMETHYLPYRIDINES

Earl T. McBee and Ernest M. Hodnett, La Fayette, Ind., assignors to Purdue Research Foundation, West Lafayette, Ind., a corporation of Indiana No Drawing. Application September 4, 1945, Serial No. 614,436

7 Claims. (Cl. 260—290)

This invention relates to certain (trifluoromethyl) pyridines, and is more particularly concerned with the compounds having one or two trifluoromethyl radicals attached to carbon atoms of the pyridine ring and which may or may not be further halogenated on the ring.

These compounds are stable, water-white liquids or solids, insoluble in water and in concentrated hydrochloric acid, and soluble in various organic solvents. In general, they exhibit no basic properties. These compounds are useful as intermediates in the preparation of other chemical compounds. They have been isolated in a state of analytical purity and the physical properties have been determined.

We have prepared these compounds by the chlorination of methylpyridines, in which complete substitution took place on the side-chain and, in some cases, to some extent on the ring as well, the chlorine in the side-chains being replaced subsequently by fluorine. The chlorination of the side-chains may be carried out at moderately elevated temperatures in the presence of actinic light. Chlorination on the pyridine ring, which is ordinarily difficult to accomplish, appears to be aided in this case by the presence of one or more trichloromethyl groups on the ring, and goes forward when the temperatures of the chlorination reaction are raised to about 200° centigrade. This fluorination may be accomplished with hydrogen fluoride.

The following examples illustrate the practice of our invention but are not to be construed as limiting:

Example 1

Two hundred seventy-nine grams (3 moles) of 2-methylpyridine was chlorinated in an electrically-heated, 4-foot length of Pyrex glass tubing, 51 millimeters in diameter. This was fitted with a thermometer and a condenser, the exit of which led into a water trap. Chlorine was admitted through an extra-coarse gas dispersion disc. Light was supplied by two banks of incandescent light bulbs.

Forty milliliters of water was added to the tube, covering the disc, the flow of chlorine was started through the disc, and the 2-methylpyridine was added. The temperature of the reaction mixture was maintained below 50° centigrade for two hours by immersing the tube in an ice-water bath. At this time there was only one liquid layer. The ice was then allowed to melt and heat applied. The temperature was elevated to 150° centigrade during one hour and maintained at that point for about twenty-nine hours. The rate of chlorine flow was adjusted to keep the solution saturated. When no more chlorine was being absorbed, the flow of chlorine was stopped and the contents of the tube aerated. After cooling, the chlorinated product and the hydrochloric acid form two separate layers. The lower layer was found to contain 64.9 per cent of chlorine. This layer was rectified at 15 millimeters mercury pressure absolute and several fractions were obtained. From these fractions the following compounds were purified and identified: 2-(trichloromethyl) pyridine in a yield of 1.52 per cent, boiling at 122° to 125° centigrade; 5-chloro-2-(trichloromethyl) pyridine, in a yield of 9.7 per cent, boiling from 147° to 155° centigrade; 3,5-dichloro-2-(trichloromethyl) pyridine, in a yield of 16.9 per cent, boiling at 182° to 185° centigrade; and 3,4,5-trichloro-2-(trichloromethyl) pyridine, boiling at 201° to 205° centigrade. These compounds are insoluble in water and in concentrated hydrochloric acid, but soluble in organic solvents.

The chlorinated products were then fluorinated. Five hundred twenty-four grams (approximately 2⅔ moles) of 2-(trichloromethyl) pyridine and 600 grams (30 moles) of hydrogen fluoride were placed in a one and one-half liter nickel-lined autoclave and heated for twenty-eight hours at a maximum tempertaure of 204° centigrade. The produce, a black liquid containing a considerable quantity of hydrogen fluoride, was steam-distilled, dried with anhydrous calcium chloride, and rectified at reduced pressure on a 4-foot glass-packed column. Several fractions wer obtained comprising ring-chlorinated (trifluoromethyl) pyridines. Thus, 5-chloro-2-(trifluoromethyl) pyridine in a yield of 10.5 per cent, boiling at 85.5° to 91.0° at 100 millimeters of pressure absolute was obtained. On recrystallization the compound melted at 37.5° to 38.0° centigrade and boiled at 91° to 92° centigrade at 100 millimeters pressure. The molecular weight of this compound was found to be 181, corresponding well to the theoretical molecular weight of 5-chloro-2-(trifluoromethyl) pyridine. Analysis showed 19.4 per cent chlorine and 29.6 per cent fluorine, which corresponded substantially to the theoretical values of 19.5 and 31.4 per cent respectively. Also, 3,5-dichloro-2-(trifluoromethyl) pyridine was obtained boiling at 114° to 115° centigrade at 100 millimeters pressure and having a freezing point of 15° centigrade. A density of 1.5122 and a refractive index of 1.4780 at 25° centigrade.

Example 2

Two hundred fourteen grams (2 moles) of 2,6-dimethylpyridine was chlorinated in a manner similar to that outlined in Example 1 with some variation in temperature. The reaction mixture was held below 50° centigrade during the first two hours, maintained at that point for nineteen hours, and then raised to 180° centigrade for six hours. The product crystallized on standing.

Vacuum filtration of the product gave 281 grams of crude 2,6-bis (trichloromethyl) pyridine which was recrystallized from 95 per cent ethyl alcohol to give 237 grams or 37.8 per cent of purified product. The filtrate was later used in the prepration of chloro-2,6-bis (trichloromethyl) pyridine. This product was then fluorinated in the manner outlined below.

One hundred twenty-two grams (0.39 mole) of 2,6-bis-(trichloromethyl) pyridine and 320 grams (16 moles) of hydrogen fluoride were heated in a one and one-half liter nickel-lined autoclave for thirty hours at a maximum temperature of 300° centigrade. The product of the reaction was a dark liquid which immediately became solid upon the addition of water. This solid was distilled at atmospheric pressure and recrystallized from 95 per cent ethyl alcohol to give 49.5 per cent of 2,6-bis-(trifluoromethyl) pyridine, having a molecular weight of 215, melting at 56.5° to 57.5° centigrade, and boiling at 149° to 150° centigrade at 748 millimeters of mercury pressure absolute. The compound analyzed 52.4 per cent of fluorine, which corresponded well to the theoretical value of 53.2 per cent.

Example 3

The filtrate obtained by vacuum filtration of the crystallized mixture of chlorinated 2,6-dimethylpyridine, comprising mostly 2,6-bis(trichloromethyl) pyridine, was further chlorinated to attain chlorination on the pyridine ring. Chlorine was added to the material in the presence of light in a glass reactor. The temperature was raised to 150° centigrade during the first two hours, and was maintained at that temperature for fifteen and one-half hours. The temperature was then raised to 200° centigrade and maintained there for one and one-half hours. The chlorinated mixture, which was a liquid at room temperature, was vacuum-distilled and several fractions obtained, all of which crystallized on standing for a few hours. Some unreacted 2,6-bis-(trichloromethyl) pyridine was obtained, but we also isolated a compound identified as chloro-2,6-bis(trichloromethyl) pyridine, boiling at 180° to 185° centigrade at 9 millimeters pressure absolute. This fraction was recrystallized twice from 95 per cent ethyl alcohol and a white solid was obtained, melting at 86.5° to 87.5° centigrade, with a chlorine content of 71.6 per cent corresponding substantially to the theoretical value of 71.3 per cent. It is assumed that the chlorine is substituted in the 3-position on the pyridine ring, since pyridine is chlorinated in that position most readily. The yield of this compound was 11.9 per cent.

One hundred grams (0.29 mole) of chloro-2,6-bis-trichloromethyl pyridine was fluorinated with 150 grams (7.5 moles) of hydrogen fluoride by heating in a one and one-half liter nickel-lined autoclave for twenty-nine and five-tenths hours at a maximum temperature of 278° centigrade. The liquid product was steam-distilled. The steam-volatile product was dried and redistilled in an ordinary distilling flask. On rectification, we isolated from the product chloro-2,6-bis (trifluoromethyl) pyridine, boiling at 164.6° to 165° centigrade at 748.2 millimeters pressure, freezing at 1.6° to 2.0° centigrade, and having a density of 1.5644, and a refractive index of 1.4140 at 25° centigrade. The compound analyzed 14.1 per cent chlorine and 45.3 per cent fluorine, corresponding substantially to the theoretical values of 14.2 and 45.8 per cent, respectively.

Example 4

One hundred seven grams (1 mole) of 2,4-dimethylpyridine was chlorinated in a manner similar to that outlined in Example 1 with some variation in temperature. The temperature of the reaction mixture was held below 50° centigrade for three hours, raised to 150° centigrade during the next four hours, and maintained at that point for six hours. Water was added dropwise to prevent the precipitation of any hydrochloride during the chlorination. A crystalline product separated on cooling. This solid was recrystallized from 95 per cent ethyl alcohol, giving dark-colored crystals which we decolorized with activated charcoal. On a second recrystallization from dilute alcohol (200 milliliters of 95 per cent alcohol in 30 milliliters of water), white crystals were obtained having a melting point of 86.5° to 87.5° centigrade. This solid analyzed 67.8 per cent chlorine, which is the same as the theoretical value of chlorine in 2,4-bis (trichloromethyl) pyridine.

Fluorination of 2,4-bis (trichloromethyl) pyridine was accomplished by heating with hydrogen fluoride in a nickel-lined autoclave. The products of three fluorinations were combined, steam distilled, dried, and reactified on a 50-inch Lecky-Ewell column. Several fractions were obtained. 2,4-bis(trifluoromethyl) pyridine, boiling at 69.5° to 70.5° centigrade at 100 millimeters pressure was obtained. This did not crystallize when cooled to —50° centigrade. The density of this compound was 1.4701, and the refractive index was 1.3833 at 25° centigrade. It analyzed 51.4 per cent fluorine, the theoretical value for fluorine being 53.2 per cent. Chloro-2,4-bis (trifluoromethyl) pyridine, boiling at 85° to 86° centigrade at 100 millimeters pressure, was obtained which also did not crystallize when cooled to —50° centigrade. The density of this compound was 1.5426, and the refractive index was 1.4113 at 25° centigrade. This analyzed 13.0 per cent chlorine and 45.8 per cent fluorine, corresponding substantially to the theoretical values of 14.2 and 45.8, respectively. The yield of chloro-2,4-bis (trifluoromethyl) pyridine, based on 2,4-dimethylpyridine, was 10.5 per cent. It was assumed that the chlorine was substituted in the 5-position as substitution takes place most easily in the beta position in this compound.

We claim:
1. 5-chloro-2(trifluoromethyl) pyridine having the formula

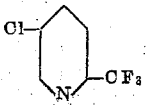

2. 3,5 - dichloro - 2(trifluoromethyl) pyridine having the formula

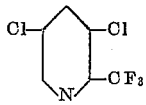

3. 2,6-bis(trifluoromethyl) pyridine having the formula

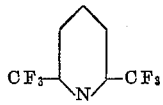

4. Chloro-2,6-bis-trifluoromethylpyridine, having the formula

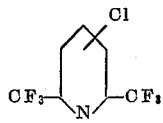

5. 2,4-bis(trifluoromethyl) pyridine having the formula

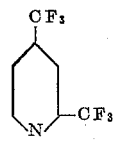

6. Chloro - 2,4 - bis(trifluoromethyl) pyridine having the formula

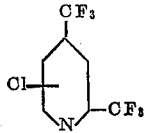

7. A fluoromethylpyridine having the following structural formula:

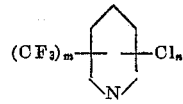

wherein $m$ is an integer from one to two, inclusive, and wherein $n$ is an integer from zero to two, inclusive.

EARL T. McBEE.
ERNEST M. HODNETT.

REFERENCES CITED

The following references are of record in the file of this patent:

UNITED STATES PATENTS

| Number | Name | Date |
|---|---|---|
| 2,121,330 | Scherer | June 21, 1938 |
| 2,180,772 | Scherer | Nov. 21, 1939 |

FOREIGN PATENTS

| Number | Country | Date |
|---|---|---|
| 786,123 | France | 1935 |

OTHER REFERENCES

Maier, "Das Pyridine und Seine Derivatives" (1934).
Chemical Abstracts, vol. 31 (1937), page 689.
Groggins, "Unit Processes in Organic Synthesis," 1938, pages 157 and 158.
Sidgwick, Organic Chemistry of Nitrogen, Oxford Press (1942), page 522